(12) United States Patent
Jiang et al.

(10) Patent No.: US 7,830,638 B1
(45) Date of Patent: Nov. 9, 2010

(54) STRUCTURE AND METHOD FOR LOCALIZING SOLDER BALL STRAIN ON HARD DISK DRIVE SUSPENSION GIMBAL

(75) Inventors: Hai Hua Jiang, GuangXi province (CN); Hai Ming Zhou, NT (HK); Fei He, Dongguan (CN); Li Jun Ma, GuangDong province (CN)

(73) Assignee: Magnecomp Corporation, Murrieta, CA (US)

( * ) Notice: Subject to any disclaimer, the term of this patent is extended or adjusted under 35 U.S.C. 154(b) by 713 days.

(21) Appl. No.: 11/893,006

(22) Filed: Aug. 13, 2007

(51) Int. Cl.
*G11B 5/48* (2006.01)
*G11B 21/16* (2006.01)
*G11B 5/60* (2006.01)

(52) U.S. Cl. ............... 360/234.5; 360/244.3; 360/245.9

(58) Field of Classification Search ............... 360/234.5, 360/234.6, 245, 245.3, 245.5, 245.8, 245.9, 360/246
See application file for complete search history.

(56) References Cited

U.S. PATENT DOCUMENTS

| | | | |
|---|---|---|---|
| 5,896,247 A * | 4/1999 | Pan et al. ................. | 360/234.5 |
| 5,956,209 A * | 9/1999 | Shum ...................... | 360/244.3 |
| 6,215,626 B1 | 4/2001 | Kajitani | |
| 6,466,413 B1 * | 10/2002 | Takasugi ................. | 360/245.9 |
| 6,496,332 B1 | 12/2002 | Okazaki et al. | |
| 6,710,978 B2 | 3/2004 | Holaway et al. | |
| 6,751,843 B2 | 6/2004 | Girard | |
| 6,940,694 B2 * | 9/2005 | Ohwe et al. ............. | 360/234.6 |
| 6,952,329 B2 | 10/2005 | Childers et al. | |
| 6,965,499 B1 * | 11/2005 | Zhang et al. ............. | 360/234.8 |
| 6,966,976 B1 | 11/2005 | Mcgraw et al. | |
| 6,993,824 B2 | 2/2006 | Childers et al. | |
| 7,002,780 B2 | 2/2006 | Rancour et al. | |
| 7,006,331 B1 | 2/2006 | Subrahmanyam et al. | |
| 7,006,333 B1 | 2/2006 | Summers | |
| 7,099,116 B1 | 8/2006 | Mei | |
| 7,137,187 B2 | 11/2006 | Pan et al. | |
| 7,152,303 B2 | 12/2006 | Childers et al. | |
| 7,154,708 B2 | 12/2006 | Chhabra et al. | |
| 7,161,765 B2 | 1/2007 | Ichikawa et al. | |
| 7,545,605 B2 * | 6/2009 | Hagiya et al. ............ | 360/234.5 |
| 2005/0195529 A1 * | 9/2005 | Tsuchida et al. ......... | 360/234.5 |

(Continued)

FOREIGN PATENT DOCUMENTS

JP          2006221690          8/2006

*Primary Examiner*—William J Klimowicz
(74) *Attorney, Agent, or Firm*—Intellectual Property Law Offices of Joel Voelzke, APC (57) ABSTRACT

In a flexure assembly for a hard disk drive suspension, a structure for preventing strains introduced by solder ball bonding from affecting the pitch static attitude (PSA) and other characteristics of the flexure assembly is presented. The structure includes a flexure that features two side rails that support a gimbal tongue, with the side rails also supporting a laterally extending bridge which is attached at its two ends to the side rails. The bridge is wide enough at its central portion to accommodate the flex trace circuit bonding pads, yet narrow enough at its ends to relieve strains caused by solder ball bonding and cooling and prevent those strains from significantly affecting the PSA. The gimbal tongue is thus, to an effective extent, mechanically and thermally isolated from the solder ball bonding pads, while at the same time the bridge provides strong mechanical support for the solder ball bonding pads.

20 Claims, 4 Drawing Sheets

U.S. PATENT DOCUMENTS

| | | | |
|---|---|---|---|
| 2006/0087769 A1* | 4/2006 | Ohsawa et al. | 360/234.5 |
| 2006/0193084 A1 | 8/2006 | Satoh et al. | |
| 2006/0262456 A1 | 11/2006 | Wang et al. | |
| 2006/0285251 A1* | 12/2006 | Hagiya et al. | 360/234.5 |
| 2006/0285252 A1* | 12/2006 | Hagiya et al. | 360/234.5 |
| 2007/0076327 A1* | 4/2007 | Yang et al. | 360/294.4 |
| 2007/0115591 A1* | 5/2007 | Yao et al. | 360/245.3 |
| 2007/0223144 A1* | 9/2007 | Yao et al. | 360/294 |

* cited by examiner

STRUCTURE AND METHOD FOR LOCALIZING SOLDER BALL STRAIN ON HARD DISK DRIVE SUSPENSION GIMBAL

CROSS-REFERENCE TO RELATED APPLICATIONS

None.

BACKGROUND OF THE INVENTION

1. Field of the Invention

This invention relates to the field of disk drive suspension assemblies. More particularly, this invention relates to the field of a method and structure for localizing solder ball strain on the gimbal of a hard disk drive suspension assembly.

2. Description of Related Art

A hard disk drive (HDD) unit generally uses a spinning storage medium (e.g., a disk or platter) to store data. A read-write head is positioned in close proximity to the spinning storage medium by a suspension assembly. A suspension assembly commonly includes a base plate, a load beam, and a flexure trace gimbal to which a slider is mounted. The slider supports the read-write head transducer element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disk surface. The suspension assembly is moved by a voice coil motor, sometimes simply called an actuator motor.

A typical suspension assembly includes a flex trace formed or applied to the top of the load beam. The flex trace typically comprises an insulating layer such as polyimide, with electrically conducting traces such as copper traces formed on the polyimide. The electrical traces carry the data read signals and the data write signals. The flex traces terminate at bonding pads at the distal end of the flex trace. The bonding pads must be connected somehow to the electrical connection points on the slider. Known methods of electrically connecting the bonding pads to the slider include gold ball bonding and solder ball bonding. Solder ball bonding is accomplished by positioning a solder ball at the head slider and trace bonding pads, and applying heat at or near the solder ball. The heat melts the solder ball. The solder wets to the head slider and to the trace bonding pads.

One problem with solder ball bonding is that expansion and contraction due to heating and cooling during and after the solder ball bonding process and the resulting strains can cause distortion in the head suspension components at or near the bonding region, which can affect head suspension characteristics such as pitch static attitude (PSA).

One attempt to mechanically and thermally isolate the solder bonding area in order to minimize this distortion is disclosed in U.S. Pat. No. 6,965,499 issued to Zhang et al. Zhang et al. disclose a dielectric cross member on which the bonding pads are located, with the dielectric cross member being supported at its central portion by a longitudinally extending beam that is connected on one side to the gimbal tongue.

A second structure for a hard disk drive suspension gimbal with solder ball bonding is shown in U.S. Patent Publication No. 2006/0262456 A1 by Wang et al, which discloses a structure featuring a gimbal tongue near the distal end of a suspension. The solder ball bonding pads are located near where the gimbal tongue begins. Angled slots at the juncture of a gimbal cross bar and the gimbal tongue purportedly relieve stress on the gimbal. Cutouts in the vicinity of the bonding pads allow the magnetic read/write head in the slider to be electrically bonded to one or more bonding pads present on the other side of the gimbal tongue.

SUMMARY OF THE INVENTION

The present invention provides a structure and method for localizing solder ball strain, thus reducing the potential for solder ball strain to negatively affect the suspension head assembly characteristics such as PSA. According to an exemplary embodiment, a flexure assembly for a hard disk drive includes a gimbal, a slider head including a read/write data transducer for reading data from the disk and writing data to the disk, and a flex circuit trace which carries the read/write data signals from the head slider to the data read/write circuits. The gimbal includes two laterally extending rails or beams which support a gimbal tongue on which the head slider is mounted. The flexure assembly includes a bridge structure which defines a bonding pad support structure and which extends laterally across the flexure assembly, and which spans a pair of gaps on either side of the bridge. The gap on the proximal side of the flexure assembly (the side closest to the base portion of the suspension assembly) physically separates the bridge on which the bond pads are located from the gimbal tongue, such that the bridge is not part of the gimbal tongue and is physical separated from it. Furthermore, each bonding pad is separated in a longitudinal direction from the gimbal tongue by the gap. The flex trace may be constructed in the standard manner such as with polyimide as the dielectric base material and copper signal traces to carry the data signals. The copper signal traces terminate at the distal end at respective trace circuit bonding pads. The trace circuit bonding pads are electrically connected to corresponding electrical signal contacts on the head slider by solder ball bonds performed in an otherwise conventional manner.

The bridge is wide enough in the area of the bonding pads to accommodate and to provide strong mechanical under support for the bonding pads during the solder ball bonding process and during the rest of the manufacturing and assembly processes. At the same time, the ends of the bridge where the bridge is connected to the beams which support the gimbal tongue are sufficiently narrow so that the strains caused by the heating and subsequent cooling of the solder ball bonds does not significantly affect the characteristics of the flexure, most specifically the PSA of the gimbal tongue and the head slider. Preferably the ends of the bridge where the bridge connects to the support beams are narrow enough so that the bridge can rotate slightly in pitch in response to solder ball strain without significantly affecting the PSA. In an illustrative embodiment, the bonding region of the bridge defined by the region where the bonding pads are located is at least twice as wide as the bridge ends which are connected to the gimbal support beams. The gap which completely separates the bonding region of the bridge from the gimbal tongue provides both thermal separation to minimize the amount of heat which is applied during the solder ball bonding process from reaching the gimbal tongue and the portions of the beams which support the gimbal tongue, and also provides mechanical separation to minimize the effect which solder ball bonding strain has on the PSA and other characteristics of the gimbal tongue and its attached head slider.

A flexure assembly constructed according to the invention can be combined with the usual components of a disk drive including an optical disk in the case of an optical disk drive or a magnetic disk in the case of a magnetic disk drive, a voice coil motor or actuator motor for moving the suspension assembly, and a suspension assembly including a base portion coupled to the actuator motor, a suspension spring portion connecting the base portion to a load beam, and the load beam which includes the flexure assembly at its distal end.

Exemplary embodiments of the invention will be further described below with reference to the drawings, in which like numbers refer to like parts.

DETAILED DESCRIPTION OF THE PREFERRED EMBODIMENTS

Figure 1:
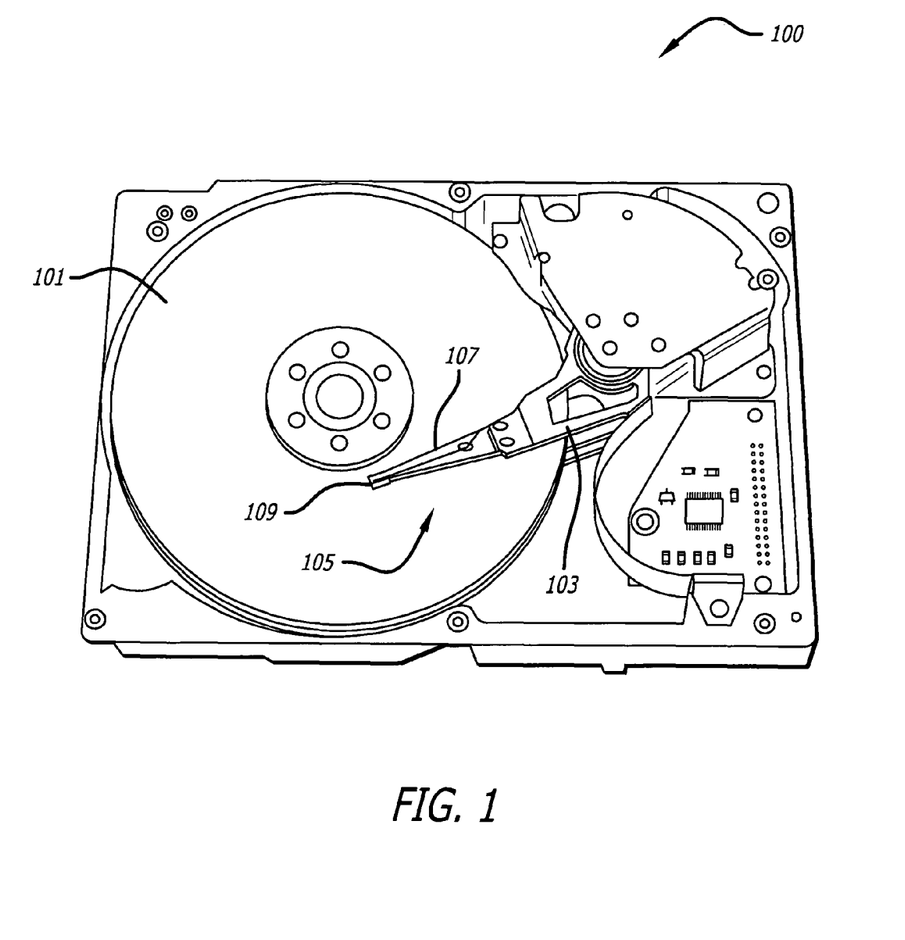
FIG. 1 is a perspective view of a disk drive.

With reference to FIG. 1, a typical disk drive 100 includes a rotating platter or disk 101, a suspension assembly 105 including an actuator arm 103 and a load beam 107. The disk may be either an optical disk or a magnetic disk. A head slider 109 including a read/write data transducer is located at the distal end of the load beam.

Figure 2:
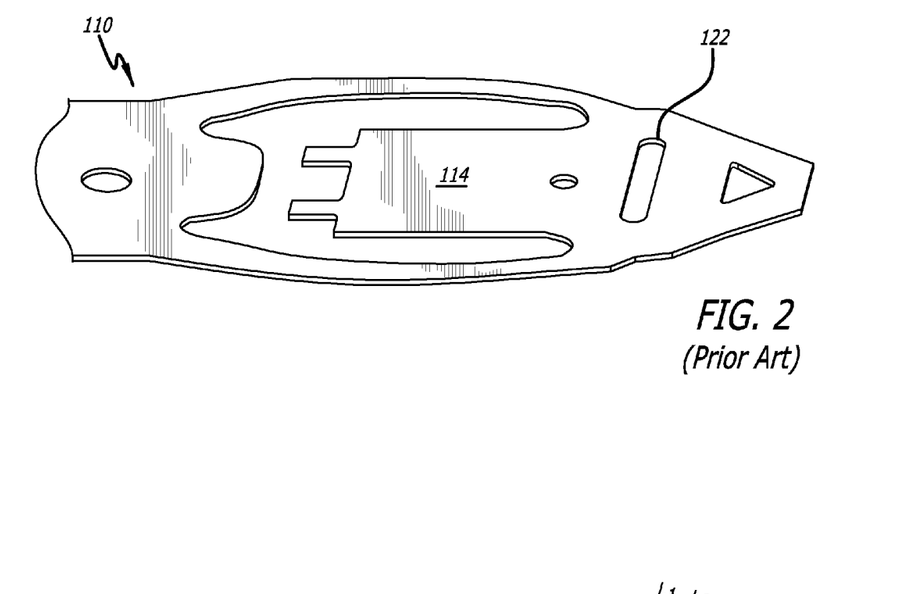
FIG. 2 is perspective view of a prior art flexure.

FIG. 2 is a perspective view of a prior art flexure 110. Flexure 110 may be formed integral with the load beam or may be formed separately and then attached to the load beam. Flexure 110 is commonly formed integral with a load beam, with both the load beam and the flexure being formed by etching a single sheet of stainless steel to form both the load beam and the flexure. Flexure 110 includes a gimbal tongue 114 to which a head slider is mounted. A slot 122 is provided to so that a flow of inert gas such as dry nitrogen may be provided during the solder ball bonding process. The flow of inert gas helps prevent oxidation of the solder and electrical contacts during the solder ball bonding process.

Figure 3:
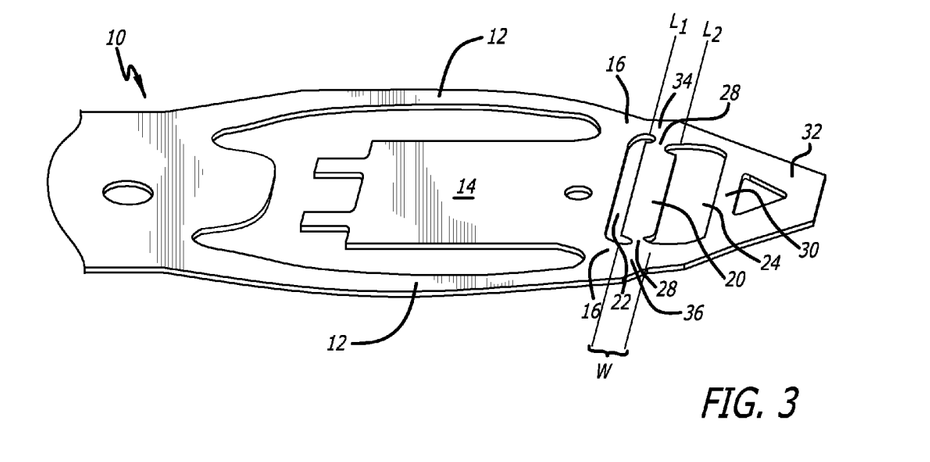
FIG. 3 is a perspective view of a flexure according to an exemplary embodiment of the present invention.

FIG. 3 is a perspective view of a flexure constructed in accordance with an exemplary embodiment of the present invention. Flexure 10 includes two side rails or beams 12 which support gimbal tongue 14 on which the head slider will be mounted. Rails 12 extend in a longitudinal direction of the suspension assembly, i.e., along the length of the suspension assembly. Rails 12 may also be curved or bent so that they also include some lateral extension as well. In the figure, rails 12 extend longitudinally and also curve both outward in the vicinity of the gimbal tongue and then inward slightly to a point at the distal end of flexure 10.

The flexure includes two gaps or holes 22 and 24 which extend laterally, i.e., from side to side. Together the two gaps 22 and 24 define a laterally extending bridge 20 which extends across the gaps. Distal of bridge 20 is a laterally extending cross beam 30 and a nose 32, whose existence and details may vary depending on other construction details of the disk drive which are not considered pertinent to the invention. Bridge 20 will support the bonding pads of the flex trace circuit as will be described below, and thus can be thought of as a bonding pad support structure. Bridge 20 is wide enough across its main portion to support the flex trace circuit bonding pads which will be applied. At the same time, ends 28 of bridge 20 are narrow enough so that strains due to expansion and contraction caused during heating and cooling during the solder ball bonding process do not significantly impact the PSA or other suspension assembly characteristics. Ends 28 are preferably narrow enough so that bridge 20 can rotate in a pitch direction slightly without significantly affecting the PSA. Preferably, bridge ends 28 are less than half as wide as the central portion of bridge 20 which will support the bonding pads, i.e., bridge 20 is twice as wide at its central region where it will support the bonding pads than at its ends 28 where it is supported by side rails 12. In an exemplary embodiment, the width of the bridge 20 at its main central portion where it supports the bonding pads from underneath is 0.15-0.20 mm wide, and more particularly is about 0.16 mm wide. In the same exemplary embodiment, bridge 20 narrows at its connection points 28 to less than 0.10 mm, and more particularly to approximately 0.06 mm.

Gap 22 extends at least past the width of the row of solder balls that will be applied. Gap 22 preferably extends a distance of at least 90% of the width of gimbal tongue 14, and more preferably extends at least the entire width of gimbal tongue 14, and more preferably still extends a distance of slightly more than the width of gimbal tongue 14. Gap 22 therefore provides significant mechanical and thermal isolation between bridge 20 which will support the bonding pads and the solder balls, and gimbal tongue 14. In an exemplary embodiment, gap 22 is 0.05-0.08 mm wide, and more particularly is about 0.07 mm wide. Bridge ends 28, which define bridge supports and bridge attachment points, are completely separate from gimbal tongue attachment points 16, at which gimbal tongue 14 is attached to and supported by side rails 12. Gimbal tongue attachment points 16 serve as gimbal tongue supports, with gimbal tongue 14 supported therebetween.

As further seen in FIG. 3, bridge connection points 28, which are the ends of the bonding pad support structure or bridge 20, lie within a width W defined by the width of bridge 20, the width W being defined by the distance between line $L_1$ which lies at the proximal edge of bridge 20, and line $L_2$ which lies at the distal edge of bridge 20. Bridge connection points 28 are therefore thinner than the bonding region of bridge 20 within an area that is defined by the longitudinal extent of bridge 20 including the bonding region. Bridge connection points 28 connect to outside supporting areas 34 and 36 that are wider than connection points 28, still within the longitudinal extent of bridge 20. Both of the supporting areas 34 and 36 of side rails 12 are wider than bridge 20. Each of the two bridge connection points 28 are therefore directly connected on one side to a support area 34/36 of side rail 12, the support area 34/36 being wider than the bridge connection point 28, and being connected on the other side to bridge 20, all within the longitudinal extent of bridge 20.

Figure 4:
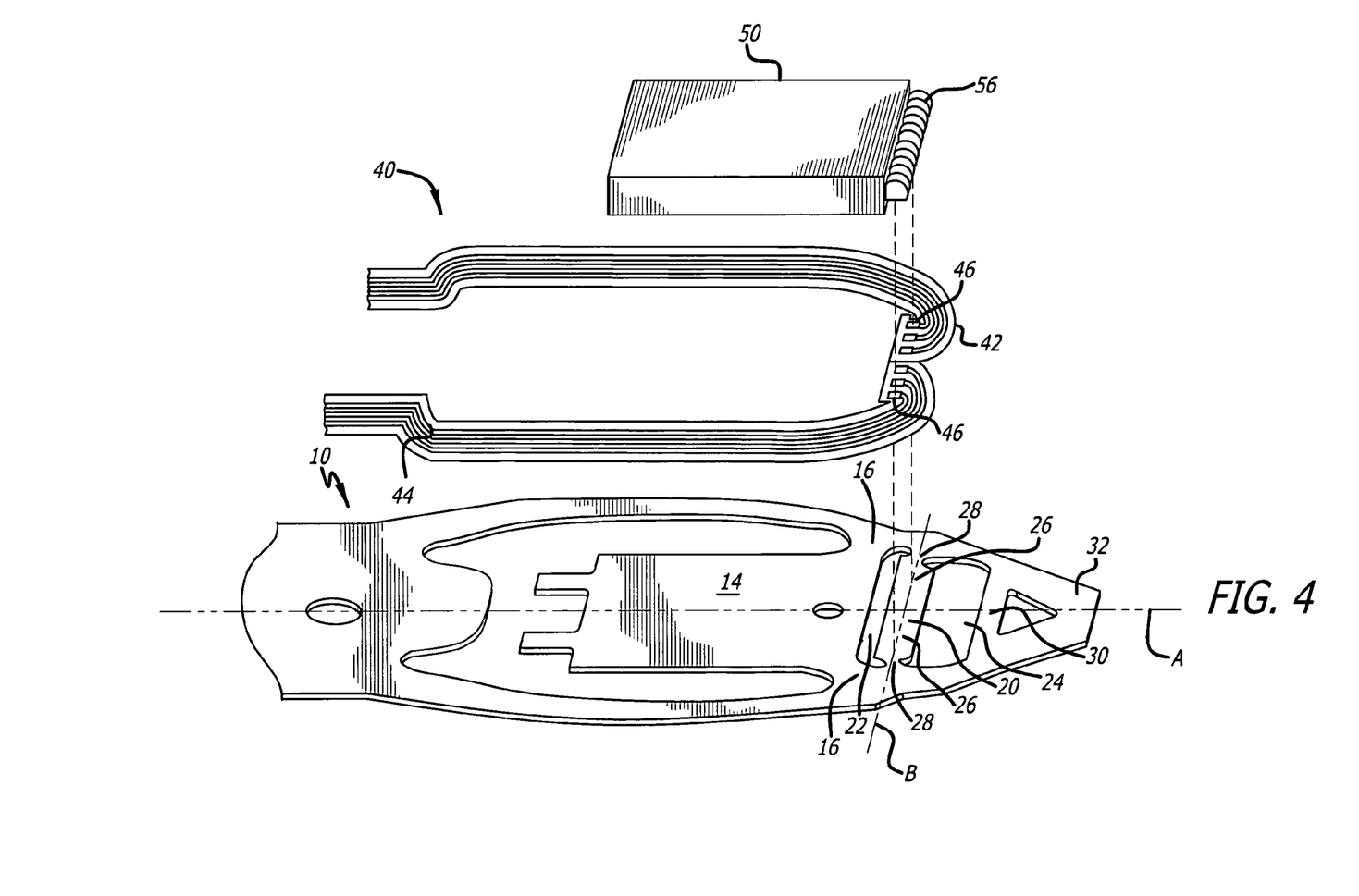
FIG. 4 is an exploded view of a flexure assembly including the flexure of FIG. 3, a flex trace circuit, and a head slider.

FIG. 4 is an exploded view of a flexure assembly according to an exemplary embodiment of the present invention including flexure 10 of FIG. 3, a flex trace circuit 40, and a head slider 50. Flex trace circuit 40 includes a plurality of individual electrically conducting signal traces 44 which terminate near distal end 42 at respective signal bonding pads 46. Flex circuit 40 is commonly formed of polyimide or other dielectric material, with signal traces 44 of copper or other conductive metal material formed thereon. Additional polyimide or other insulative material may then be deposited over the copper traces for electrical protection, except in the area of bond pads 46. Flex circuit 40 may alternatively be formed by a subtractive process in which a laminate sheet of polyimide with a copper layer on top is etched to form the desired signal traces. Signal traces 44 carry the data read signal and the data write signals from the read/write data interface circuits to slider 50. Signal traces 44 terminate at or near their respective ends at bonding pads 46. Head slider 50, which carries the data read/write transducers for reading data from the disk platter and for writing data to it, includes a number of electrical contacts (not show). The slider electrical contacts may be formed by applying gold plating to a copper seed layer. The copper seed layer may be connected to the read head or the write head through an electrode stud formed inside the slider. Solder balls 56 electrically connect the read/write electrical contacts in slider 50 to signal traces 44. Typically solder balls 56 are applied by positioning a ball of unmelted solder into the corner defined by bond pads 46 and slider 50 such that solder balls 56 contact both bond pads 46 and the electrical contacts on slider head 50. The solder is then melted by directing hot air or some other source of heat to the solder or near the solder. The solder then melts and wets against both bond pads 46 and the electrical contacts on the slider head to provide electrical communication from slider head 50 to flex circuit 40. The electrical contacts and signal traces include at least a pair of read conductors and a pair of write conductors.

Figure 5:
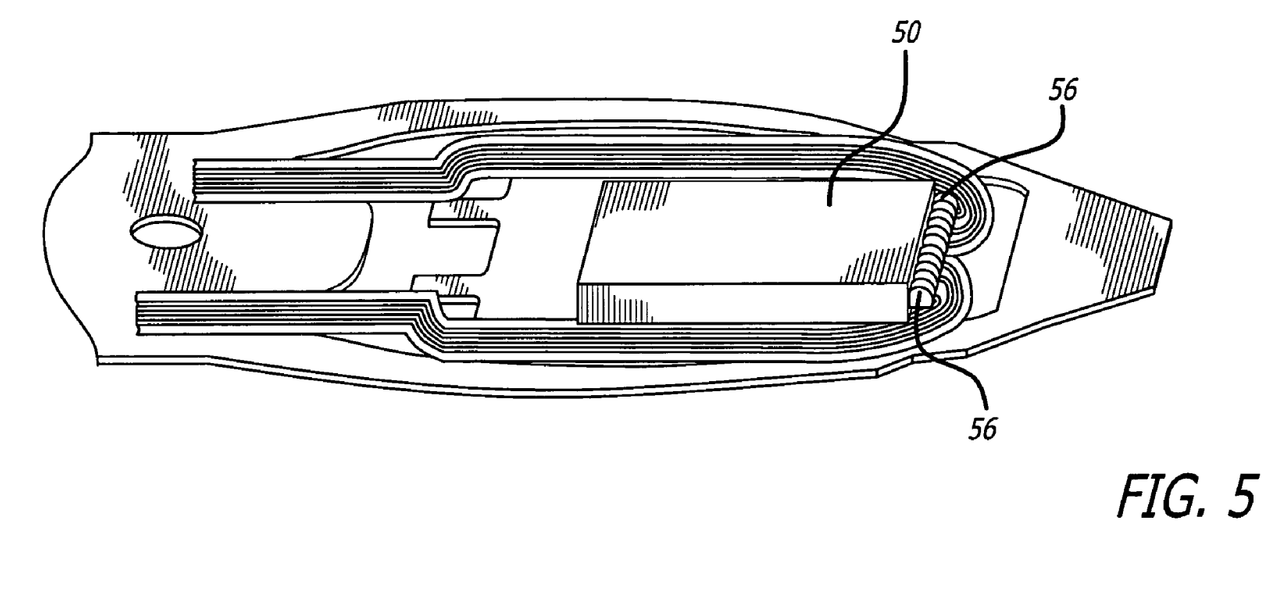
FIG. 5 is a perspective view of the flexure assembly of FIG. 4, as assembled.

Solder balls 56 are positioned over and electrically connecting to electrical signal bond pads 46 which are in turn positioned over respective points on bridge 20. In this way bond pads 46 are solidly supported at points 26 by bridge 20 which is supported in tension between two attachment points 28. The bridge extends laterally across flexure 10 along lateral axis B, which is perpendicular to longitudinal axis A which extends lengthwise along flexure 10 and along the overall load beam. The row of bonding pads 46 defines a bonding region on bridge 20. Slot 22 allows a flow of inert gas such as nitrogen to reach solder balls 56 so that the solder does not oxidize during the solder ball bonding process. Gaps 22 and 24 are shaped with ends that extend toward the central lateral axis of bridge 20 so as to make bridge 20 narrowest at its attachment points 28.

Because flex trace circuit bonding pads 46 are directly mechanically supported underneath by bridge 20, bridge 20 helps to prevent excessive movement and possible damage to bond pads 46 and their electrical connections with slider 50 during the solder ball bonding process and during subsequent manufacturing steps such as cleaning. Specifically, the direct mechanical support underneath bonding pads 46 and the row of solder balls 56 prevents movement in a direction normal to a plane of flexure 10. Locations 26 at which bond pads 46 are located are wide enough to accommodate and support bonding pads 46 and solder balls 56. Bridge attachment points 28 are significantly narrower than is the bonding region of bridge 20 where bond pads 46 are located. Bridge 20 is narrowest at bridge attachment points 28, and is wider at all other points along its length to accommodate bond pads 46 and row of solder balls 56. In one embodiment bridge attachment points 28 are significantly narrower than the width of bonding pads 46 and solder balls 56. Specifically, bridge 20 is narrower at its attachment points 28 than the width of the narrowest solder ball 56. In one embodiment bridge 20 is completely unsupported other than at its two lateral ends. Bridge 20 is thus physically separated from gimbal tongue 14. Laterally extending gap 22 thus separates in a longitudinal direction each bonding pad 46 from gimbal tongue 14. Bridge attachment points 28 are not located on gimbal 20, and are physically separate from and are not the same as gimbal tongue attachment points 16. The physical separation helps to prevent heating and cooling of bridge 20, which necessarily happens during the solder ball bonding process, from having too great an effect on the rest of the flexure including gimbal tongue 14. Furthermore, bridge 20 can rotate slightly along lateral axis B without significantly affecting gimbal tongue 14. Bridge 20 including its narrowed attachment points 28 therefore help to isolate bridge 20 on which electrical bond pads 46 are located, both thermally and mechanically. This thermal and mechanical separation between bridge 20 and gimbal tongue 14 helps to prevent errors in PSA and other characteristics of the flexure assembly from being introduced during the solder ball bonding process.

Furthermore, bridge 20 is separated from cross beam 30 and distal tip 32 by second gap 24, such that each loci where a bonding pad 46 is positioned over bridge 20 is separated in the longitudinal direction from distal tip 32.

In one method of manufacture, flexure 10 is formed by starting with a sheet of stainless steel material and removing material by etching away the desired portions including gap 22 and gap 24 to form flexure 10 including side support rails 12, gimbal tongue 14, bonding pad support structure or bridge 20, and cross beam 30. Rails 12, gimbal tongue 14, and bonding pad support structure 20 are thus of construction, with the gap which separates bonding pad support structure 20 from gimbal tongue 14 formed by etching.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A suspension assembly for a hard disk drive suspension comprising:
    a flexure assembly comprising:
        longitudinally extending side rails;
        a gimbal tongue attached to and supported by the longitudinally extending side rails, the gimbal tongue being supported at one or more gimbal tongue attachment points; and
        a bridge extending laterally across the flexure assembly and supported directly by the longitudinally extending side rails, the bridge being supported at opposite ends thereof at first and second bridge attachment points, the bridge attachment points being distal of the gimbal tongue attachment points, the bridge being configured to be physically separated from the gimbal tongue and not supported by the gimbal tongue;
    a head slider mounted to the gimbal tongue, the head slider having a plurality of head slider electrical contacts for carrying data read and write signals;
    a plurality of signal traces having respective trace bonding pads electrically connected thereto, each of the bonding pads being disposed on the bridge, whereby the bonding pads are directly mechanically supported to prevent excess movement during processing in a direction normal to a plane of the flexure assembly during assembly and are physically separated from the gimbal tongue; and
    a plurality of electrical bonds electrically connecting the head slider electrical contacts to the trace bonding pads.

2. The suspension assembly of claim 1 in combination with a load beam coupled to the flexure assembly for mounting to an actuator motor, a base portion, and at least one suspension spring coupling the load beam to the base portion.

3. The suspension assembly of claim 1 wherein the electrical bonds define a row of solder ball bonds on the bridge and extending laterally across the flexure assembly.

4. The suspension assembly of claim 1 wherein the bridge is narrowest at the bridge attachment points, and is wider at all other points along its length.

5. The suspension assembly of claim 1 wherein the bridge is physically separated from the gimbal tongue by a slit which extends at least 90% of a width of the gimbal tongue.

6. The suspension assembly of claim 5 wherein the slit extends the entire width of the gimbal tongue.

7. The suspension assembly of 1 wherein the bridge is unsupported other than at its ends at said first and second bridge attachment points.

8. A suspension assembly comprising:
a flexure assembly comprising:
longitudinally extending side rails;
a gimbal tongue supported by the longitudinally extending side rails; and
a bonding pad support structure having a first end and a second end laterally disposed from the first end, the bonding pad support structure extending laterally across the flexure assembly and attached directly to the side rails at first and second ends thereof, the bonding pad support structure not being attached directly to the gimbal tongue;
a read/write transducer mounted to the gimbal tongue;
a plurality of bonding pads disposed on the bonding pad support structure, the bonding pads being electrically connected to the transducer at respective transducer contacts;
wherein a laterally extending gap separates in a longitudinal direction each bonding pad from the gimbal tongue.

9. The suspension assembly of claim 8 wherein the side rails, the gimbal tongue, and the bonding pad support structure are of unitary construction, and the laterally extending gap which separates the bonding pad support structure from the gimbal tongue is formed by removing material.

10. The suspension assembly of claim 8 wherein the bonding pad support structure is located distal of the gimbal tongue.

11. The suspension assembly of claim 8 wherein the bonding pad support structure is wider where each bonding pad is located than it is at points where the bonding pad support structure is attached to the side rails.

12. The suspension assembly of claim 8 wherein the bonding pad support structure is attached to the flexure assembly at said first and second bonding pad support structure ends, said bonding pad support structure ends being disposed laterally with respect to each other, and said bonding pad support structure being unsupported other than at said two bonding pad support structure ends.

13. The suspension assembly of claim 12 wherein the bonding pad support structure is sufficiently narrow at its ends to allow the bonding pad support structure to rotate slightly along an axis that is lateral to the flexure assembly.

14. The suspension assembly of claim 13 wherein the bonding pad support structure is 0.15-0.20 mm wide underneath where the bonding pads are located, and is less than 0.10 mm wide at said bonding pad support structure ends where it is attached to the side rails.

15. The suspension assembly of claim 8 wherein the bonding pad support structure is separated from a distal tip of the flexure assembly by a second laterally extending gap, the second laterally extending gap separating in a longitudinal direction each bonding pad from the distal tip.

16. A suspension assembly comprising:
a flexure assembly comprising:
a pair of side rails;
a gimbal tongue connected to the side rails and disposed therebetween; and
a bonding pad support structure extending laterally with respect to the flexure assembly and connected to the side rails at first and second ends of the bonding pad support structure, the bonding pad support structure having a bonding region, and being less than half as wide at said first and second ends than at said bonding region; and
a row of electrical bonding pads disposed on the bonding pad support structure and defining said bonding region;
wherein a gap in the flexure assembly physically separates the entire row of electrical bonding pads from the gimbal tongue and
wherein the first and second bonding pad support structure ends are connected directly to the side rails, said first and second ends being less than half as wide within a longitudinal extent of the bonding pad support structure as said bonding region of said bonding pad support structure.

17. The suspension assembly of claim 16 wherein the bonding pad support structure is thin enough at its ends such that it can pitch slightly with respect to the side ends without significantly affecting the alignment attitude of the gimbal tongue.

18. The suspension assembly of claim 17 wherein each of said bonding pads is disposed over a line defined at a first end by the point where the first end of the bonding pad support structure is connected to a gimbal tongue support, and at a second end by the point where the end of the bonding pad support structure is connected to a gimbal tongue support.

19. The suspension assembly of claim 16 further comprising:
a head slider mounted to the gimbal tongue, and a plurality of solder balls connecting respective ones of the electrical bonding pads to respective signal contacts on the head slider;
wherein the bonding pad support structure narrows at its first and second ends to less than the width of the narrowest solder ball.

20. The suspension assembly of claim 19 wherein the bonding pad support structure is formed by etching away material on both a proximal and a distal side of the flexure assembly until the bonding pad support structure is connected to the load beam only at said first and second bonding pad support structure ends.

* * * * *

UNITED STATES PATENT AND TRADEMARK OFFICE
CERTIFICATE OF CORRECTION

| | | |
|---|---|---|
| PATENT NO. | : 7,830,638 B1 | Page 1 of 1 |
| APPLICATION NO. | : 11/893006 | |
| DATED | : November 9, 2010 | |
| INVENTOR(S) | : Hai Hua Jiang et al. | |

It is certified that error appears in the above-identified patent and that said Letters Patent is hereby corrected as shown below:

In claim 17, column 8, line 35, after "side," delete "ends" and insert -- rails --.

Signed and Sealed this
First Day of March, 2011

David J. Kappos
*Director of the United States Patent and Trademark Office*